United States Patent
Mohaban

(10) Patent No.: US 7,907,525 B2
(45) Date of Patent: *Mar. 15, 2011

(54) METHOD OF COMMUNICATING PACKET MULTIMEDIA TO RESTRICTED ENDPOINTS

(75) Inventor: Shai Mohaban, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 95 days.

This patent is subject to a terminal disclaimer.

(21) Appl. No.: 12/359,592

(22) Filed: Jan. 26, 2009

(65) Prior Publication Data

US 2009/0135837 A1 May 28, 2009

Related U.S. Application Data

(63) Continuation of application No. 10/993,665, filed on Nov. 18, 2004, now Pat. No. 7,483,437.

(60) Provisional application No. 60/524,168, filed on Nov. 20, 2003.

(51) Int. Cl.
*G01R 31/08* (2006.01)

(52) U.S. Cl. ............... 370/230; 370/395.52; 726/11

(58) Field of Classification Search ............ 370/230, 370/252, 352, 392, 395.21, 395.52, 401; 726/11–14; 709/226
See application file for complete search history.

(56) References Cited

U.S. PATENT DOCUMENTS

| | | | |
|---|---|---|---|
| 6,874,084 B1 | 3/2005 | Dobner et al. | |
| 6,967,995 B1 | 11/2005 | Hwang et al. | |
| 7,085,267 B2 | 8/2006 | Carey et al. | |
| 7,245,622 B2 | 7/2007 | Huitema | |
| 7,333,500 B2 | 2/2008 | Roshko | |
| 7,417,982 B2 | 8/2008 | Jain et al. | |
| 2002/0095599 A1 | 7/2002 | Hong et al. | |
| 2003/0014691 A1 | 1/2003 | Abdelilah et al. | |
| 2003/0037132 A1* | 2/2003 | Abdollahi et al. | 709/223 |
| 2003/0233471 A1 | 12/2003 | Mitchell et al. | |
| 2003/0235183 A1 | 12/2003 | Skelton et al. | |
| 2004/0024879 A1 | 2/2004 | Dingman et al. | |
| 2004/0034793 A1* | 2/2004 | Yuan | 713/200 |
| 2004/0181695 A1 | 9/2004 | Walker | |
| 2004/0190549 A1 | 9/2004 | Huitema | |
| 2005/0039051 A1* | 2/2005 | Erofeev | 713/201 |
| 2007/0192508 A1 | 8/2007 | Sollee | |
| 2007/0299939 A1 | 12/2007 | Johnston | |
| 2009/0205039 A1* | 8/2009 | Ormazabal et al. | 726/11 |

OTHER PUBLICATIONS

U.S. Appl. No. 10/995,982, filed Nov. 18, 2004, entitled "Media Path Optimization for Multimedia Over Internet Protocol".

* cited by examiner

*Primary Examiner* — Jayanti K Patel
*Assistant Examiner* — Jung Park
(74) *Attorney, Agent, or Firm* — Shumaker & Sieffert, P.A.

(57) ABSTRACT

A method, performed in a network element, for communicating packet multimedia data between a first endpoint and a second endpoint, the method comprising the machine-implemented steps of receiving an outbound multimedia data packet; determining if the outbound multimedia data packet originated from a first endpoint that is logically behind a security device; determining and storing information identifying a logical pinhole in the security device, wherein the logical pinhole is associated with expected inbound multimedia data packets directed to the first endpoint; performing an action that keeps the logical pinhole open during all of a communication session between the first endpoint and the second endpoint; and forwarding inbound multimedia data packets directed from the second endpoint to the first endpoint via the logical pinhole.

17 Claims, 5 Drawing Sheets

METHOD OF COMMUNICATING PACKET MULTIMEDIA TO RESTRICTED ENDPOINTS

CROSS-REFERENCE TO RELATED APPLICATIONS

This application is a continuation of U.S. patent application Ser. No. 10/993,665, filed Nov. 18, 2004, entitled "Method of Communicating Packet Multimedia to Restricted Endpoints," now U.S. Pat. No. 7,483,437, which claims the benefit of U.S. Provisional Application No. 60/524,168, filed Nov. 20, 2003, entitled "Method of Communicating Packet Multimedia to Restricted Endpoints," the entire contents of each of which is incorporated herein by reference. This application is related to U.S. patent application Ser. No. 10/995,982, filed Nov. 18, 2004, entitled "Media Path Optimization For Multimedia Over Internet Protocol," by inventor Shai Mohaban, the entire contents of which is hereby incorporated by reference herein.

FIELD OF THE INVENTION

The present invention relates generally to multimedia over Internet protocol networks and more specifically relates to communicating packet multimedia across firewalls and network address translators.

BACKGROUND OF THE INVENTION

Multimedia over Internet protocol (MoIP) refers to voice, video, and other types of media transmitted over computer networks using the Internet protocol (IP). Media, such as voice signals, is first digitized to transform the analog input into a stream of digital data. Such data may be compressed depending on the requirements and capabilities of the transmitting and receiving systems. The data, whether compressed or uncompressed, is transmitted over an IP network by first formatting the data stream into multiple discrete packets.

Another characteristic of multimedia communications is that a signaling channel is often used to convey control requirements between endpoints and between endpoints and call control servers. The control channel is eventually used to establish one or more media channels for transferring media between two or more endpoints. Media includes, but is not limited to voice, video, white board data, and instant messaging. The signaling channel can be based on user datagram protocol (UDP) or transmission control protocol (TCP) depending on the multimedia signaling protocol that is used. For example, the H.323 protocol often uses TCP, while session initiation protocol (SIP) and media gateway control protocol (MGCP) often use UDP. Most media traffic is real-time by nature, and therefore uses UDP, or real-time transport protocol (RTP), which is based on UDP. In most cases, parameters for media communication are negotiated using the signaling protocol, and are not known in advance.

The use of multimedia over IP is rapidly spreading throughout the world, and often there is a need to set up or deploy multimedia IP endpoints behind a firewall or a network address translator ("FW/NAT devices" herein). Common scenarios include deploying IP phones in an enterprise network behind the enterprise FW/NAT device, and setting up IP endpoints behind a residential broadband gateway that serves residential broadband users. In the latter scenario, the residential gateway serves as a FW/NAT.

The problems that FW/NAT devices create for MoIP communications may be understood with reference to the function of a pinhole in a FW/NAT device. The term pinhole refers to a configuration of a FW/NAT device that logically and conceptually creates a temporary opening in the FW/NAT device through which data can be transmitted to and from an endpoint placed behind the FW/NAT device. Configuring a pinhole thus allows packets belonging to the same stream to return back to the endpoint. Practically all FW/NAT devices permit (or can be configured to permit) opening symmetric pinholes through them for limited periods of time, provided that the initiator of the pinhole is an entity logically inside the FW/NAT device. Most data protocols, such as e-mail, web, and file transfer protocol (FTP) operate in that manner.

Specifically, a client application opens a session, usually over the transmission control protocol (TCP), and establishes a temporary symmetric pinhole in the FW/NAT device. The client application then requests certain information (e.g., Web page content), receives the information in a response, and eventually closes the connection. The FW/NAT device allows the response information to enter the area protected by the FW/NAT device. The pinhole is termed symmetric because the FW/NAT device permits entry of traffic only from the responding (external) entity that received the initial request. The FW/NAT device closes the pinhole when the client or server closes the connection. However, most FW/NAT devices also will close the pinhole upon reaching a certain timeout threshold, regardless of the response or request to terminate the connection (this is particularly important for protocols based on UDP which is not even connection oriented). These devices enforce such timeouts based on a policy that maintaining pinholes open for too long represents a security risk and wastes memory and processing resources.

UDP also is commonly used for transferring data across the Internet. Network traffic using UDP is also usually permitted through the FW/NAT device as long as the network traffic is initiated by an entity protected by the FW/NAT device. UDP is commonly used by applications such as instant messaging, file sharing, and multimedia. Most FW/NAT devices permit a process behind the FW/NAT device to open a UDP session, and can be configured to do so for specific port numbers without introducing any real security threat.

The most restrictive and secure implementation is that of a symmetric FW/NAT device where only the external entity that was contacted by an internal entity can reply to the internal entity through the FW/NAT device. Some of the more important MoIP signaling protocols are based on UDP, or at least optionally have such a capability. However, a challenge with UDP is that unlike TCP, which follows a very explicit state machine, UDP provides no clear indication to intermediate devices, such as FW/NAT devices, about when a session is actually closed. Therefore, to enforce a reasonable security policy, FW/NAT devices terminate existing UDP pinholes based on rather short timeout periods. In most implementations, such timeout periods are a few minutes or less, which is significantly shorter than a typical VoIP communication period.

Thus, there is a need for a way to communicate multimedia through a FW/NAT device with a protocol based on UDP that can conveniently maintain a pinhole open for the entire duration of a multimedia session, such as a VoIP call.

Accordingly, a challenge in creating a long-term connection for MoIP is in keeping the communication flowing between endpoints or users who are separated by FW/NAT devices. FW/NAT devices generally allow entities behind them to communicate with external entities by opening port pinholes for the purpose of each specific communication stream allowing temporary access to and from the external resource. However, such pinholes are indeed for specific streams initiated from the inside, and have a very limited lifetime. The pinhole are terminated after a predefined period of time or as soon as the communication is over.

Another challenge is that external endpoints outside a FW/NAT device may need to reach multimedia endpoints, which requires the external endpoints to pass traffic through a FW/NAT device. For example, receiving incoming calls is an essential part of any VoIP service. However, an incoming call does not have the capability of creating a pinhole through the FW/NAT device to enable such a connection, as a pinhole is not yet established for such a call.

Yet another challenge is that media streams use dynamically allocated port numbers, and for which the port pinhole is not known in advance. Therefore, it is impossible to establish the required connection using the allocated port without a solution for handling endpoint-to-endpoint communication.

Therefore, it would be advantageous to have a solution that establishes and maintains a permanent communication channel to multimedia endpoints residing behind FW/NAT devices. Such a channel would allow the protected endpoints to not only initiate but also receive multimedia calls. It would be further advantageous if such a solution would be compatible with commonly deployed network components and would enable establishing the multimedia channels without needing to modify any existing equipment.

SUMMARY OF THE INVENTION

A method and apparatus for communicating packet multimedia to restricted endpoints is disclosed. In one aspect, a method is performed in a network element for communicating packet multimedia data between a first endpoint and a second entity (usually a call control server), the method comprising the machine-implemented steps of receiving an outbound multimedia signaling packet; determining if the outbound multimedia signaling packet originated from a first endpoint that is logically behind a security device; determining and storing information identifying a logical pinhole in the security device, wherein the logical pinhole is associated with expected inbound multimedia signaling packets directed to the first endpoint; performing an action that keeps the logical pinhole open during all of a communication session between the first endpoint and the second entity; and forwarding inbound multimedia signaling packets directed from the second entity to the first endpoint via the logical pinhole.

The method also includes modifying signaling messages containing a Session Description Protocol (SDP) part so the media is forwarded to a media controller. The SC first allocates a pair of ports on the MC and then uses these ports in the SDP. The MC waits for a media packet from each endpoint, and then upon knowing the respective pinhole in each firewall, the MC can relay media packets back and forth between the two endpoints.

In one embodiment, a method allowing multimedia over Internet protocol (MoIP) communications between endpoints residing behind firewall and network address translation devices is disclosed. According to an embodiment, all endpoints register with a signaling controller. The endpoints are configured to begin communication by first addressing the signaling controller. The signaling controller receives the outbound signal and determines whether the endpoint is behind a firewall (FW) or network address translation (NAT) device. The signaling controller determines the pinhole that was established in the FW/NAT device of the source endpoint and stores the pinhole information for use in processing a future response from the destination endpoint back to the source endpoint. The signaling controller modifies the signaling payload as necessary or appropriate for the signaling protocol that is in use, and activates a media controller for handling all subsequent media packets. The outbound signal is forwarded to the destination endpoint.

In another embodiment, the signaling controller determines whether an endpoint's timeout is configurable. If it is configurable, the signaling controller configures the endpoint to generate periodic signaling messages to maintain the pinhole in the FW/NAT device before the FW/NAT times out the pinhole and closes it, which would cause loss of communication. According to another feature, a software utility may be added to the endpoint for generating the periodic messages if the endpoint is not timeout configurable. If the software utility cannot be added to the endpoint, then the signaling controller periodically sends a signaling "keep-alive" message to the endpoint to force the endpoint to respond, thus ensuring that the pinhole remains open.

In another embodiment, the signaling controller minimizes the number of keep-alive messages that an endpoint sends, to avoid putting a significant load on the signaling controller, or other network components, to receive and manage each of the keep-alive messages. At a certain time before reaching the maximum expected keep-alive timeout, the signaling controller sends an inquiry message to the endpoint. If the endpoint responds to the message, then the signaling controller instructs the endpoint to increase the keep-alive timeout, and the process repeats. If the endpoint does not respond to the message, the keep-alive timeout is reduced to a smaller value. The endpoint uses the largest keep-alive timeout value that allows response to the inquiry message.

In another embodiment, means for avoiding hair-pinning is provided, and is used (1) where both endpoints are behind the same FW/NAT device, or more generally are within a single routable address space, (2) where neither are behind a FW/NAT device, (3) where the destination endpoint is behind a full-cone FW/NAT, and in other cases. These and other cases are described in co-pending U.S. patent application Ser. No. 10/995,982, filed Nov. 18, 2004, entitled "MEDIA PATH OPTIMIZATION FOR MULTIMEDIA OVER INTERNET PROTOCOL," of Shai Mohaban, the entire contents of which are hereby incorporated by reference as if fully set forth herein ("Mohaban" herein).

In yet another embodiment, means are provided to convert unidirectional calls to bi-directional calls to force creation of a pinhole through a FW/NAT device. The signaling controller modifies the signaling messages of the unidirectional calls and forces them to become bi-directional by forcing the "silent" endpoint to also send media. The media controller is instructed to eliminate the media packets coming from the "silent" endpoint rather than forward them towards the other endpoint.

The disclosed techniques provide for enabling MoIP traffic in a network without requiring modifications to the existing IP and MoIP network infrastructure.

Other aspects and features will become apparent from the following description and appended claims.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for communicating packet multimedia to restricted endpoints are disclosed. In this context, "restricted endpoints" are network elements acting as endpoints in multimedia network communication and located behind a firewall, network address translator, or equivalent device. In the following description, for the purposes of explanation, numerous specific details are set forth in order to provide a thorough understanding of the present invention. It will be apparent, however, to one skilled in the art that the present invention may be practiced without these specific details.

1. General Overview

Figure 1:
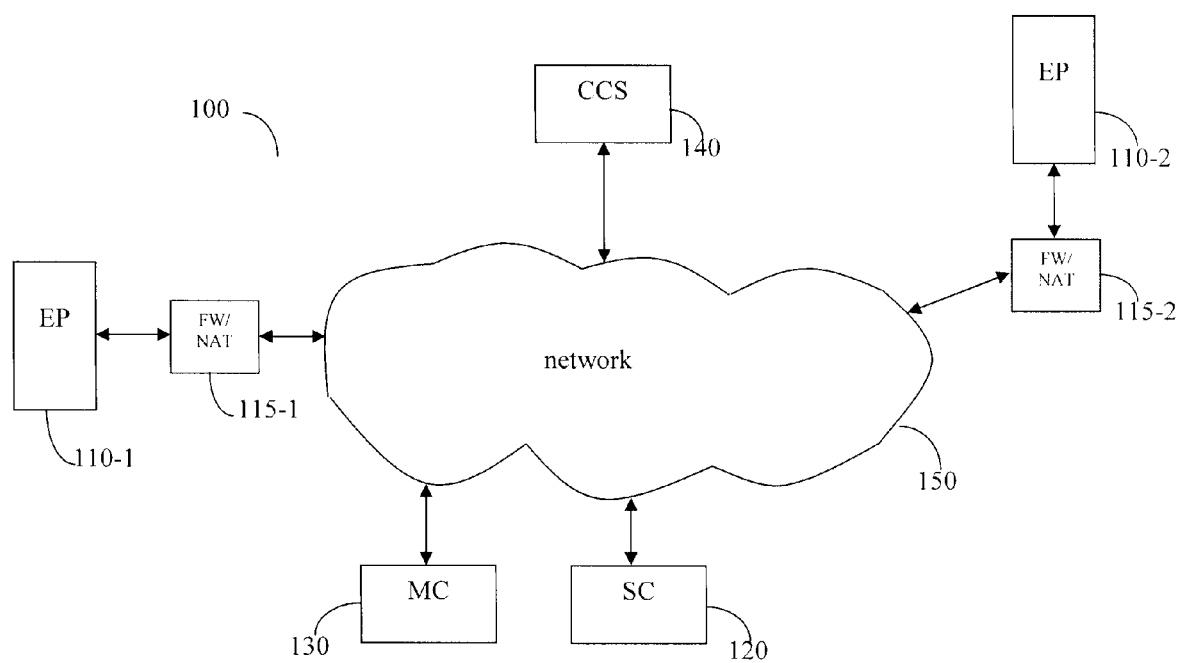
FIG. 1 is a block diagram of an example network arrangement with which an embodiment may be used.

FIG. 1 is a block diagram of an example network system 100 with which an embodiment may be used. System 100 includes a network 150, which comprises any form of network, including, but not limited to, one or more local area networks (LANs), wide area networks (WANs), and internetworks. Multimedia endpoints 110-1, 110-2 are connected to network 150. Endpoints 110-1, 110-2 broadly represent end-users or equipment used by end-users such as personal computers, workstations, wireless devices, IP phones, etc. Typically, endpoints 110-1, 110-2 are connected through FW/NAT devices 115-1, 115-2 to call control server (CCS) 140. However, connection through FW/NAT devices is not required and system 100 can have a mixture of device configurations.

In a typical voice over Internet protocol (VoIP) application, an endpoint 110-1 may wish to initiate a call to endpoint 110-2. Such a communication may involve the traversal of information over network 150 including the necessity to traverse through multiple FW/NAT devices 115-1, 115-2. Such a communication is performed under the control of CCS 140. CCS 140 may be a call control server of the type commercially available from companies including, but not limited to, Alcatel (for example, the series 1000 switching systems), BroadSoft (the BroadWorks™ servers), Siemens (series HiQ) and Sylantro. Network 150 may have one or more CCSs 140.

However, communicating through multiple FW/NAT devices requires enabling the call control signaling packets to reach the called entities that are behind the FW/NAT devices. Such communication also requires holding open a media communication throughout the duration of the conversation, which may extend beyond timeout periods of any one of the FW/NAT devices on the route. It is therefore necessary to address the issue of FW/NAT timeout periods in a manner that will allow communication throughout the period of connectivity of endpoints 110-1, 110-2 through network 150.

In one embodiment, network 150 further comprises a signaling controller (SC) 120 and a media controller (MC) 130. The SC 120 and MC 130 are configured in the manner described in more detail below. In this arrangement, the limitations of prior art systems are overcome, and continuous MoIP communication can be ensured for as long as such communication is necessary, whether it be hours or days. In one embodiment, SC 120 and MC 130 comprise devices that are commercially available from Kagoor Networks, Inc., San Mateo Calif., such as the VoiceFlow™ series, for example, the VoiceFlow 1000 and VoiceFlow 3000.

SC 120 is connected to network 150 and is capable of high-speed processing of signaling requests. SC 120 is responsible for signaling processing, namely, processing the control signals respective of MoIP applications, primarily for the purpose of maintaining FW/NAT device pinholes open throughout the duration of the MoIP communication period. A more detailed description of signaling processing by SC 120 is provided below.

MC 130 is also connected to network 150 and operates under the control of SC 120. Specifically, MC 130 handles all media packets of a MoIP transmission under the command of SC 120. MC 130 offloads from SC 120 the processing of packets that require very limited processing, such as media packets that only need to be relayed.

Multiple SCs 120 and MCs 130 may be placed in different geographical locations throughout network 150. One SC 120 may control one or more MCs 130, and one or more SCs 120 may control one MC 130.

All endpoints 110-1, 110-2, etc. are directed to SC 120, which is configured and serves as an outbound signaling proxy (or call control server) for the endpoints. Endpoints 110-1, 110-2 therefore send signaling packets to SC 120. In contrast, in conventional practice endpoints 110-1, 110-2 would direct signaling packets to CCS 140. SC 120 maintains signaling communication channels with endpoint 110-1, 110-2 and also communicates with CCS 140 to form the desired VoIP communication.

2. Establishing Communication Between Endpoints

Figure 2:
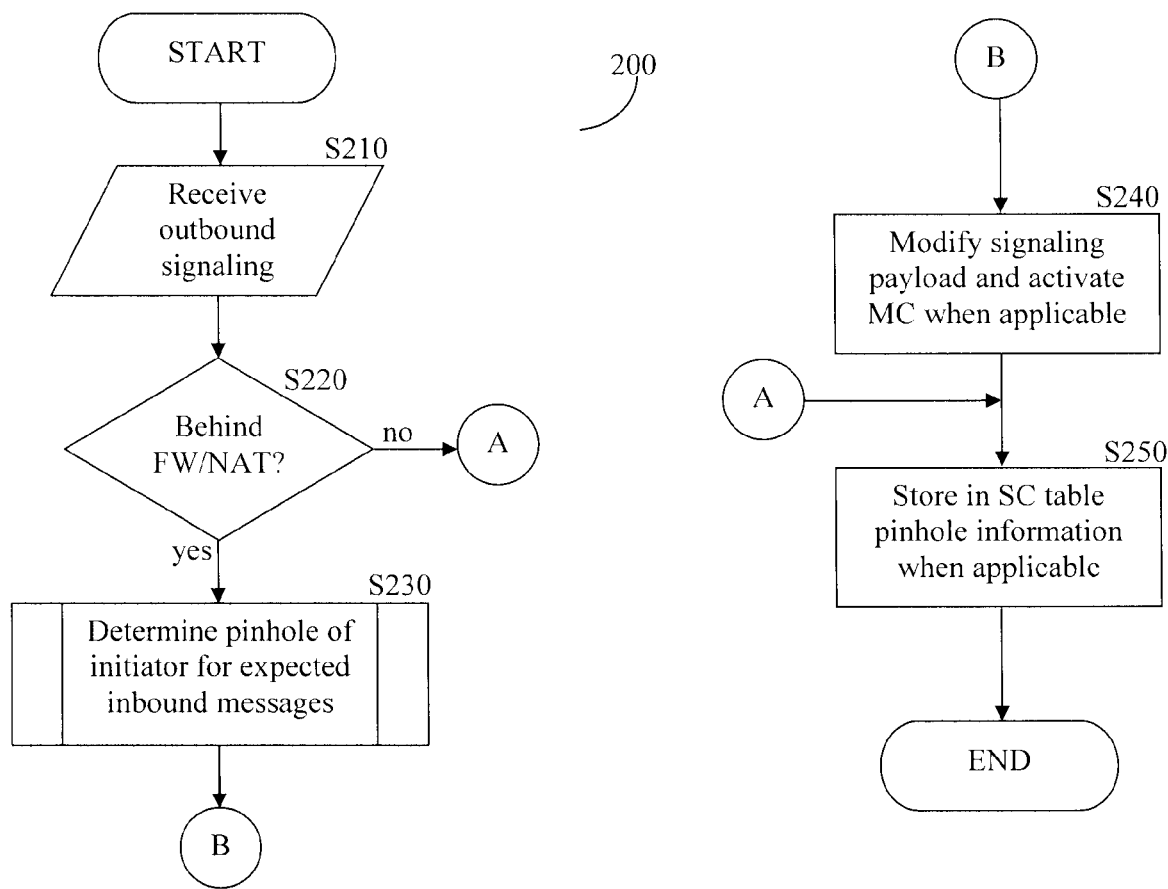
FIG. 2 is a flow diagram of a process for establishing a communication channel through a signaling controller.

FIG. 2 is a flow diagram of a process for establishing a communication channel through a signaling controller. For example, FIG. 2 illustrates an exemplary and non-limiting flowchart 200 of a process of establishing a communication channel through SC 120.

An endpoint, such as endpoint 110-1 of FIG. 1, opens a signaling connection towards SC 120 because the endpoint is configured to begin communications by addressing SC 120 as its outbound signaling proxy (or signaling server). Such signaling communications may pass through a FW/NAT device, such as FW/NAT 115-1 in the case of end-user 110-1. In such a case, a translation of the IP header occurs at the FW/NAT 115-1 with no effect on the payload itself.

In step S210, SC 120 receives the control signal originally sent from endpoint 110-1 and potentially modified by FW/NAT 115-1.

In step S220, SC 120 determines if the outbound signal was received through a FW/NAT device. In one embodiment, step S220 involves comparing the incoming source IP address of the signaling packet to the address that is in the payload. For example, SC 120 may comprise a pre-provisioned access list that map addresses to information identifying FW/NAT devices. In this arrangement, SC 120 may compare the received addresses to the access list to identify addresses behind a firewall or the addresses of NAT devices.

In another embodiment, global endpoints operating under session initiation protocol (SIP) register and communicate with SC 120 using port value 5060, and endpoints behind a FW/NAT device use a separate port on SC 120, such as port 6060. Thus, whenever SC 120 receives messages on port 6060, SC 120 can assume the messages are from endpoints located behind FW/NAT devices.

If SC 120 determines that a FW/NAT device is involved, then execution continues with step S230.

If SC 120 determines that there is no FW/NAT device involved, then according to one embodiment, execution continues with step S250, as illustrated by FIG. 2, and SC 120 remains in the path of the communication in both directions. In another embodiment, SC 120 forwards the message towards the destination endpoint, and instructs the destination endpoint to communicate directly with the source endpoint. Thus, all future communications towards the source endpoint are not directed to SC 120 but rather go directly towards that source endpoint.

In step S230, SC 120 determines the FW/NAT pinhole to be used in conjunction with communication with endpoint 110-1. If the signaling protocol is symmetric SIP, the port number value for the pinhole is the same as the outbound pinhole port. If the signaling protocol is MGCP, then the pinhole port number value for inbound messages is learned as part of receiving the first message, which is usually a re-start in progress (RSIP) message.

In the case of asymmetric SIP, SC 120 may determine the port number value, for example, by the endpoint sending out periodic SIP messages, which serve as pinhole keep-alive (KA) messages. In such a case, SC 120 uses the first relevant KA message received in conjunction with opening the signaling channel to learn the pinhole port. SC 120 then uses the inbound port number value to send subsequent packets from the destination endpoint, such as endpoint 110-2, or from CCS 140 to the source endpoint, such as endpoint 110-1.

In step S240, modification of the signaling payload is performed. In one embodiment, SC 120 modifies the payload of the signaling packet to present its own IP address to CCS 140, or to MC 130. As a result, SC 120 identifies itself as the node to which inbound packets should be sent from any other entity that is trying to communicate with endpoint 110-1. By managing appropriate tables or other data structures, SC 120 can map port values for ports on which inbound data is received to pinholes associated with each endpoint that is receiving responsive data, such as endpoint 110-1.

In step S250, the address and port information are stored in SC 120.

3. Maintaining a Pinhole

For the purpose of establishing a robust signaling communication with all endpoints, SC 120 keeps open pinholes in FW/NAT devices in response to determining that a device capable of MoIP is located behind a FW/NAT device. However, many FW/NAT devices will automatically time out such pinholes, or pinholes may be lost if a FW/NAT device reboots. Once a pinhole is closed, a destination endpoint or other network element outside the domain protected by the FW/NAT device cannot establish a new pinhole; such network elements must wait until such a source endpoint re-establishes the pinhole. To overcome this issue, according to an embodiment, a keep-alive (KA) process for the signaling pinholes is performed.

Figure 3:
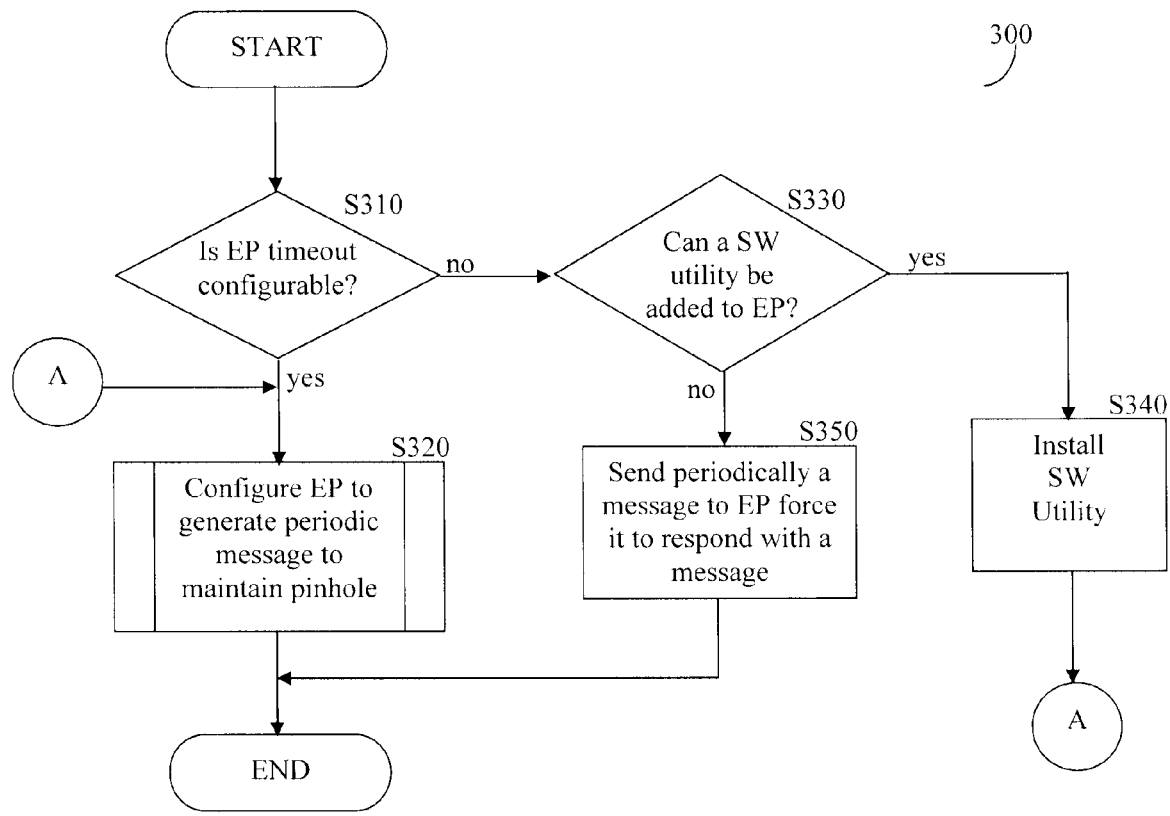
FIG. 3 is a flow diagram of a process for keeping a pinhole open.

FIG. 3 is a flow diagram of a process for keeping a pinhole open. FIG. 3 illustrates an exemplary and non-limiting flowchart 300 of a process of keeping a pinhole open. In step S310, SC 120 determines the type of timeout capabilities of endpoint 110-1. In particular, SC 120 determines whether the pinhole timeout value used by endpoint 110-1 is configurable using software commands or network messages. If endpoint 110-1 is configurable, then execution continues with step S320; otherwise, execution continues with step S330.

In step S320, endpoint 110-1 is configured to periodically send a message to SC 120 for the purpose of keeping the pinhole open. When endpoint 110-1 and SC 120 use symmetric SIP as a signaling protocol, step 320 can involve modifying a reply to the REGISTER message towards the endpoint 110-1 so that the registration expiration timeout (RET) is shorter than the FW/NAT pinhole timeout (PHT). The RET value should be sufficiently smaller than PHT in order to ensure proper operation. For non-symmetrical SIP and MGCP, other keep-alive (KA) messages may be used. In those cases, the endpoint is configured to periodically generate and send such a KA message in order to keep alive the signaling pinhole in FW/NAT 115-1.

In step S330, SC 120 determines if a software utility can be added to endpoint 110-1 for the purpose of generating the periodic messages. If adding a software utility is possible, then such a software utility is installed in or uploaded to endpoint 110-1 in step S340. Control then passes to step S320, in which the software utility is configured appropriately to generate periodic messages. If adding a software utility is not possible, then execution continues with step S350.

In another embodiment, a software utility is pre-loaded in endpoint 110-1. In this embodiment, the endpoint is configured to send periodic messages to keep the pinhole open, and the steps of FIG. 3 are not necessary.

In step S350, SC 120 periodically sends a message to the endpoint to force the endpoint to respond with a message, thereby keeping the pinhole opening. In one embodiment in which the signaling protocol is SIP, SC 120 periodically sends a message to the pinhole at FW/NAT device 115-1. The FW/NAT device 115-1 forwards the message to endpoint 110 in conventional manner, thereby forcing endpoint 110 to return a message to SC 120, which keeps the pinhole available. Configuring SC 120 to send messages to the pinhole may be less reliable than the other methods described herein, because if the pinhole closes unexpectedly, there is no way to revive the pinhole from outside the FW/NAT device. The pinhole could close unexpectedly when the FW/NAT device 115-1 reboots, or when connectivity between SC 120 and the FW/NAT device 115-1 is lost for a time period that is longer than its PHT.

Some protocols, such as HTTP, do not have the capabilities to force a reply to a message. For these protocols, step S350 may involve statically configuring endpoint 110-1 to periodically send out a message, such as an HTTP message, to maintain the pinhole. Thus, if the signaling protocol in use by the SC and the endpoint does not have an inquiry message, as in SIP, then the endpoint may be configured to send a message to maintain the pinhole.

4. Tenant Location Record

Because SC 120 serves as a proxy for endpoints 110-1, 110-2, the actual application server or CCS 140 is exposed only to traffic coming from SC 120 and not exposed to traffic coming directly from the endpoints 110-1, 110-2. As a result, CCS 140 is not exposed to the IP addresses of endpoints 110-1, 110-2, or to the IP addresses of FW/NAT devices 115-1, 115-2 through which the messages pass. However, in some network deployments, each IP address of such endpoints or FW/NAT devices may be associated with a tenant location record (TLR), identifying the physical address of the endpoint or FW/NAT device. Network services, such as 911 emergency services, admission control, and codec control, use tenant location information for various reasons. According to an embodiment, SC 120 is configured to provide to such services, in response to an appropriate request message, the IP address of endpoints 110-1, 110-2 and/or the IP address the FW/NAT device that is in front of the endpoint.

In one embodiment, in which the signaling protocol is SIP, the last VIA line sent to SC 120 contains the local address of endpoint 110-1. SC 120 may leave that line and attach to it a "received" tag that contains the IP address from which the SIP message came, such as the FW/NAT device IP address.

In another embodiment, in which the signaling protocol is MGCP, SC 120 receives the local IP address of an endpoint by receiving the first session description protocol (SDP) packet from the endpoint. Normally, an SDP packet is received as soon as a call is first initiated. Therefore, until a first call is made, or unless the MGCP protocol is extended to communicate the local address earlier, at the initial stage SC 120 provides only the IP address of the endpoint's local FW/NAT device 115-1, 115-2.

In an alternative embodiment, endpoint tenant location or physical address information is communicated to the MGCP server by attaching, to each MGCP message, an extended X-VIA field having a structure similar to that of the SIP VIA field. The X-VIA field initially contains the IP address of the FW/NAT device 115-1, 115-2 that is local to the initiating endpoint 110-1, 110-2. When either endpoint participates in a call, X-VIA is updated to further contain the address of the endpoint (110-1 or 110-2) that sends the signaling message.

5. Filtering Keep-Alive Messages

Sending frequent keep-alive messages to keep pinholes open in FW/NAT devices, as disclosed herein, potentially can put great processing stress on SC 120 and on CCS 140. Therefore, in one embodiment, SC 120 and other network elements that receive the keep-alive messages are configured to quickly filter the keep-alive messages, responding to them when needed, and not forwarding them towards CCS 140. In this arrangement, CCS 140 is protected from an excessive number of messages.

For example, in the case of SIP, thousands of endpoints 110-1, 110-2 each generating a REGISTER message every 30 seconds would create an enormous load on CCS 140 acting as SIP proxy. To prevent this load from affecting CCS 140, SC 120 receives the keep-alive messages and automatically responds to them. For this purpose, SC 120 maintains a table of all the endpoints 110-1, 110-2 with registration information for each endpoint, such as user name or SIP URI, phone number, IP address, expiration time, etc. When SC 120 receives a REGISTER message, SC 120 extracts the minimum number of fields that uniquely identify the endpoint. For example, a minimum set of fields that uniquely identify an endpoint may include "from" user, "to" user, contact, via, and expiry fields. If the message is a keep-alive message and not an actual request to register with SC 120, then SC 120 generates and sends a quick response to the endpoint. SC 120 generates the response by copying the original message and sending only the required fields, such as the status line, and the expiry time.

6. Minimizing Keep-Alive Messages

To further improve performance and minimize the use of otherwise redundant KA messages, SC 120 is configured to minimize the frequency by which each endpoint 110-1, 110-2 refreshes its pinhole in FW/NAT device 115-1, 115-2. In one embodiment, SC 120 automatically discovers the required frequency by an interactive process that is performed for each FW/NAT device 115-1, 115-2.

For example, when SC 120 receives signaling through a previously unknown FW/NAT device 115-1, 115-2, SC 120 responds to the endpoint with a message containing a certain refresh keep-alive timeout value $T_{KA}$. Shortly before $T_{KA}$ is reached, for example $T_X$ seconds prior to $T_{KA}$, SC 120 sends an inquiry message, such as OPTIONS in the case of SIP, towards the endpoint.

In conventional practice, an inquiry message in SIP includes an expiry field that informs an endpoint how often to register with a server. The endpoint responds with a register reply message that indicates a specific value to the server. The server can then reply with the same expiry value, or propose a different value.

According to an embodiment, if endpoint 110-1 receives the inquiry message from SC 120 and replies, then SC 120 can send a further reply message to endpoint 110-1 that instructs the endpoint to increase the keep-alive timeout value $T_{KA}$ and repeat the process.

If no reply is received, then under normal circumstances the pinhole is closed. Therefore, SC 120 waits for the keep-alive message from the endpoint, which should not take more than $T_X$ seconds. Thereafter, with the re-established pinhole, SC 120 instructs the endpoint to decrease the keep-alive timeout value $T_{KA}$ and repeats the process.

One way to converge the process rapidly is to start with a short timeout value, such as 45 seconds, and thereafter increase the timeout, for instance by 30 seconds, as long as the process described above succeeds. As soon as the process fails, SC 120 can revert to the last timeout value that was successful, and use the last timeout value thereafter for all endpoints 110-1, 110-2 behind that particular FW/NAT device 115-1, 115-2.

Figure 4:
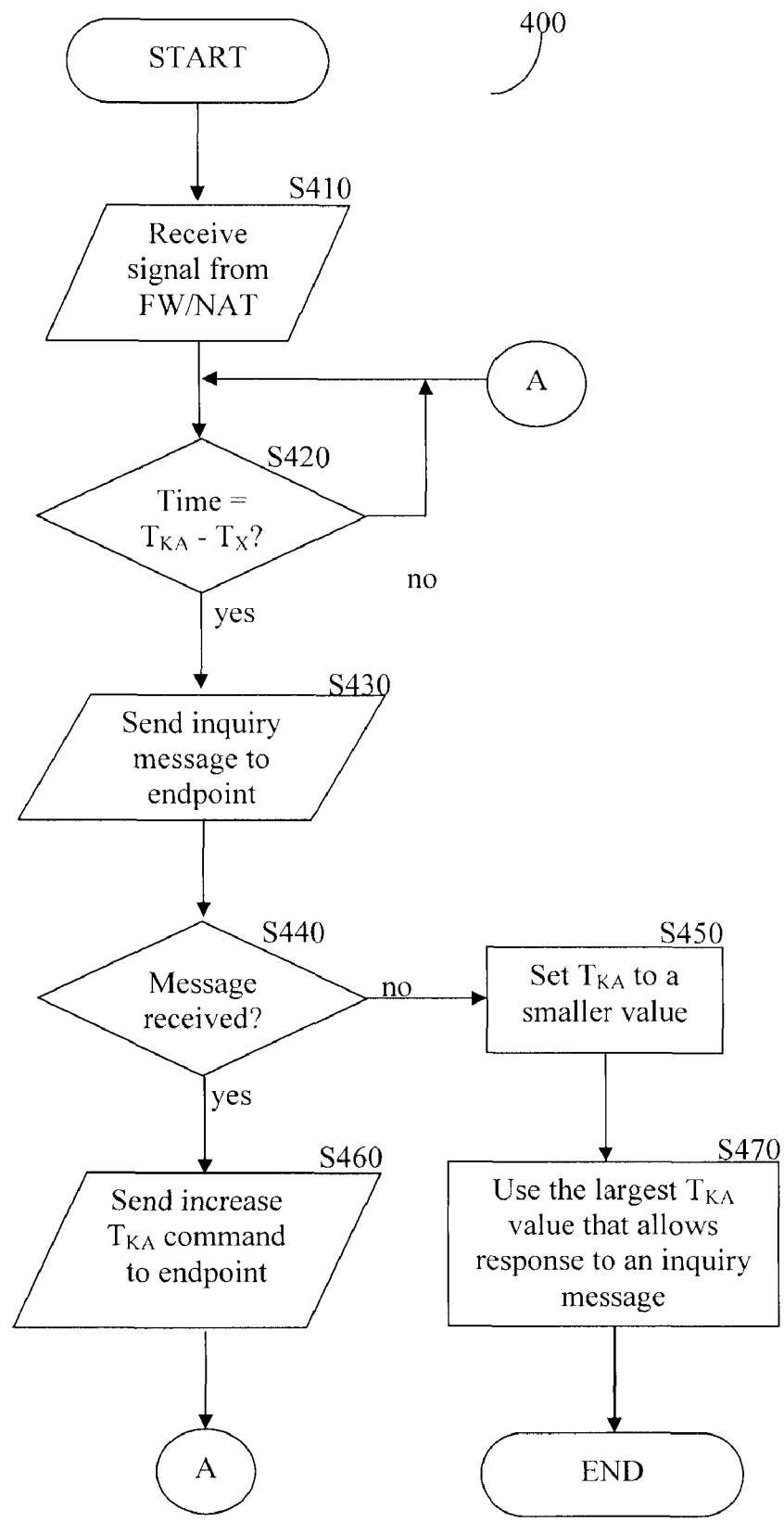
FIG. 4 is a flow diagram of a process for illustrating determination of a keep-alive refresh timeout parameter.

FIG. 4 is a flow diagram of a process for illustrating determination of a keep-alive refresh timeout parameter. FIG. 4 is a non-limiting exemplary flowchart for the determination of the $T_{KA}$ value, according to one embodiment.

In step S410, SC 120 receives a signal from FW/NAT device 115-1. In step S420, SC 120 checks whether a period shorter by $T_X$ from the maximum expected keep-alive timeout $T_{KA}$ has been reached. If not, then SC 120 waits until such time has been reached. In step S430, an inquiry message, which passes through FW/NAT device 115-1, is sent to the endpoint 110-1.

In step S440, SC 120 checks whether the message was received or not, for example, by waiting for the reply from endpoint 110-1. Step S440 may involve several actions, including waiting until determining that such a response cannot be expected.

For example, if SC 120 determines that endpoint 110-1 failed to receive the message, then at step S450 $T_{KA}$ is reduced to a smaller value, and execution continues with step S470; otherwise, execution continues with step S460.

In step S460, SC 120 sends a message to endpoint 110 instructing the endpoint to increase $T_{KA}$. SC 120 sends such a message only if the value of $T_{KA}$ has not already been previously determined and fixed. The fixing of the $T_{KA}$ value happens once no message was received after increasing $T_{KA}$ from a value where a message was received, a process that occurs in step S470.

7. Addressing and the Media Controller

As part of establishing media channels for endpoints 110, SC 120 modifies the signaling messages that negotiate the IP address and port to which the media is to be sent. For MGCP and SIP, such signaling messages are usually messages carrying a session description protocol (SDP) segment. For H.323, signaling messages are open logical channel (OLC) messages.

For each such signaling message, SC 120 allocates an IP address and port at MC 130, instructs MC 130 to start listening at that port, and then changes the signaling message so that the media is pointed to that address and port. As soon as an endpoint 110-1 receives the signaling message, endpoint 110-1 starts sending media packets towards the given address and port of MC 130. MC 130 uses these incoming media packets to learn the pinhole that has been established for the media in FW/NAT device 115-1. This pinhole is then used by MC 130 to relay all inbound media towards endpoint 110-1.

MC 130 is generally an entity dedicated to handling media packets. In another embodiment, MC 130 resides in the same physical device as SC 120. Using a separate MC 130 can off-load, from SC 120, the task of dealing with the media packets that do not require any additional signaling processing. Based on information provided by SC 120 to MC 130, MC 130 may relay media packets from initiating endpoint 110-1 to destination endpoint 110-2, and vice versa. Hence, SC 120 causes MC 130 to present itself as the node of choice when media communication takes place, which ensures symmetric communication of the multimedia channel for both endpoints.

In step S250, SC 120 stores information identifying the FW/NAT device pinhole of endpoint 110-1 in its own NAT table. Such a NAT table may be used for the operation of SC 120 and/or MC 130.

In one embodiment, the endpoints 110-1, 110-2 use symmetric multimedia channels. Although not mandated by most MoIP standards, a symmetric multimedia channel is commonly implemented. In one embodiment, endpoint 110 starts sending media packets to its destination as soon as that destination is determined, for example, when the message containing the SDP is received. As soon as the first media packet reaches MC 130 it can start sending back the incoming media packets.

8. Hairpin Avoidance

In one embodiment, SC 120 causes endpoints not to use MC 130 for media communications, but rather to directly communicate with each other, also known as avoiding hair pinning. Hair pinning, in the context of networking, is the unnecessary traversal of data packets through one or more nodes in a network. Hairpin avoidance is highly desirable mainly for traffic engineering reasons, but is not always possible depending on the types of endpoints, types of FW/NAT devices, network topology, etc. Hair pinning should be avoided, for example, when two endpoints 110 are behind the same FW/NAT device 115-1, 115-2, or, when both endpoints 110 are not behind FW/NAT devices 115-1, 115-2. Hairpin avoidance is also possible if at least one of the endpoints supports the "comedia" Internet Draft, which is described at the time of this writing in a document entitled "draft-ietf-mmusic-sdp-comedia-05.txt" and in the folder "internet-drafts" of the domain "ietf.org" on the World Wide Web. Techniques for hairpin avoidance are disclosed in the application of Mohaban referenced above.

In the case where endpoints 110-1, 110-2 are behind the same FW/NAT device, the endpoints are directed to perform point-to-point media communication rather than communicate through MC 130. When endpoints 110-1, 110-2 are not behind a FW/NAT device 115-1, 115-2, there is no need to handle the problems addressed by MC 130 and hence the associated overhead can be prevented.

If at least one endpoint 110-1, 110-2 supports the "comedia" draft and is not behind a FW/NAT device, then it is instructed to send media packets to the same address and port from which it received media. That address value and port value identify the last NAT device along the direct path between the two endpoints without the need of MC 130.

Additionally or alternatively, the signaling protocols can be extended to further enable the prevention of hair pinning in additional scenarios.

In another embodiment, hair pinning is avoided for media directed towards an endpoint that is behind a full-cone FW/NAT device. A full-cone NAT device can be configured to forward UDP traffic, which was sent to a pinhole, towards the appropriate endpoint, regardless of the sending external source IP and port values. In contrast, symmetric NAT devices only allow traffic back only from the source that was the original destination of the outbound stream.

When FW/NAT device 115-1, 115-2 is a full-cone device, then SC 120 or MC 130 waits for the first media packet to learn values identifying the pinhole. SC 120 then instructs the other endpoint to start sending its media towards that pinhole directly, rather than to the SC 120 or to MC 130. In one embodiment, in which the signaling protocol is SIP, issuing a re-INVITE message with a SDP that points to that pinhole accomplishes such instruction of the other endpoint. In MGCP, such instruction is performed using a modify connection message (MDCX).

Still another embodiment dynamically and automatically identifies which endpoints are behind full-cone FW/NAT devices. For example, in one method of identifying endpoints behind full-cone NAT devices, SC 120 uses a secondary IP address for purposes of identification. Identifying the endpoints also can be done by a separate device.

For purposes of illustrating an example, assume that the secondary IP address is X. When SC 120 first receives a connection from endpoint 110-1, SC 120 sends endpoint 110-1 an appropriate signaling message, such as an OPTIONS message in the case of SIP, from the secondary address X to the same pinhole on the FW/NAT device 115-1 that was used to communicate with endpoint 110. If FW/NAT device 115-1 is full-cone, then the FW/NAT device forwards the signaling message to endpoint 110-1. The endpoint 110-1 will reply to address X. Using this process, the hairpin avoidance method described above can be used for endpoints behind full-cone FW/NAT devices.

9. Unidirectional Calls

In packet multimedia communications, a unidirectional call is a call between an endpoint that generates media and an endpoint device that is not transmitting but is only listening. For example, the endpoint that generates media may be an announcement server, an interactive voice response (IVR) server, etc. In such unidirectional call cases, because only one party of the call generates media, no pinhole is established for the media stream coming from that party. For example, there is no pinhole for the media stream coming from an IVR server towards an endpoint 110-1 that is behind a FW/NAT device 115-1.

In another embodiment, SC 120 modifies the signaling messages of the unidirectional calls and forces them to become bi-directional. Assuming the endpoint 110-1 behind FW/NAT device 115-1 still generates periodic messages in response to "silence" (which is virtually always the case), SC 120 operates as described above for FIG. 1, FIG. 2, FIG. 3, FIG. 4. MC 130 is instructed to eliminate media packets arriving from endpoint 110-1 rather than forwarding them towards the IVR server or other endpoint (which does not expect these media packets).

10. Hardware Overview

The methods herein can be implemented using a computer-readable medium, which refers to any medium that participates in providing instructions to a processor for execution, such as the processors on SC 120 and/or MC 130.

Figure 5:
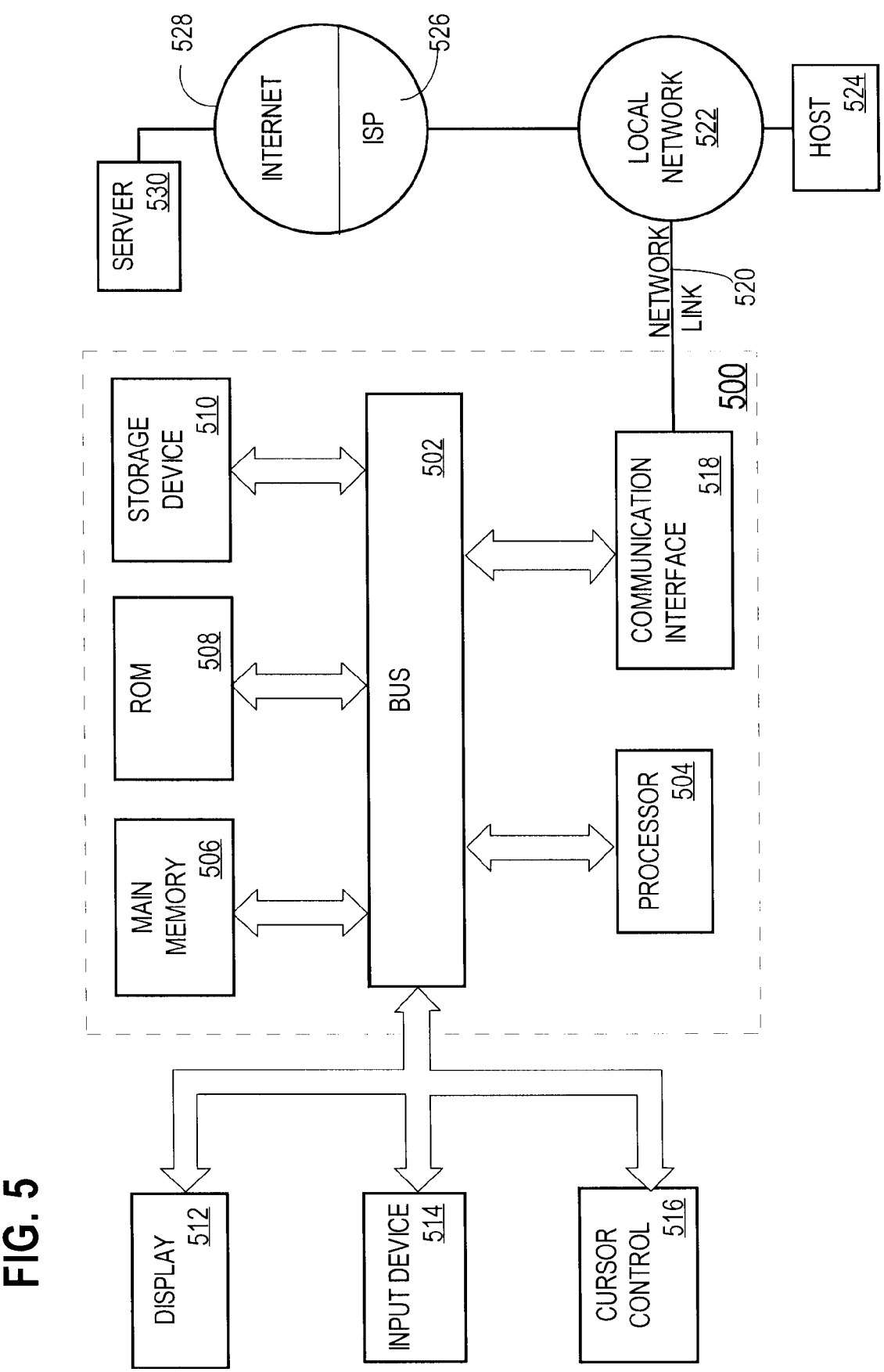
FIG. 5 is a block diagram of a computer system with which an embodiment may be implemented.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory ("RAM") or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory ("ROM") 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube ("CRT"), for displaying information to a computer user. An input device 514, including alphanumeric and other keys, is coupled to bus 502 for communicating information and command selections to processor 504. Another type of user input device is cursor control 516, such as a mouse, trackball, stylus, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for communicating packet multimedia data between a first endpoint and a second endpoint. According to one embodiment of the invention, communicating packet multimedia data between a first endpoint and a second endpoint is provided by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infrared transmitter to convert the data to an infrared signal. An infrared detector can receive the data carried in the infrared signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network ("ISDN") card or a modem to provide a data communication connection to a corresponding type of telephone line. As another example, communication interface 518 may be a local area network ("LAN") card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider ("ISP") 526. ISP 526 in turn provides data communication services through the worldwide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. In accordance with the invention, one such downloaded application provides for communicating packet multimedia data between a first endpoint and a second endpoint as described herein.

The received code may be executed by processor 504 as it is received, and/or stored in storage device 510, or other non-volatile storage for later execution. In this manner, computer system 500 may obtain application code in the form of a carrier wave.

The invention claimed is:

1. A method, performed by a network element, for communicating packet multimedia data between a first endpoint and a second endpoint, the method comprising:

receiving an outbound multimedia signaling packet;

determining if the outbound multimedia signaling packet originated from a first endpoint that is logically behind a security device;

determining and storing information identifying a logical pinhole in the security device, wherein the logical pinhole is associated with expected inbound multimedia data packets directed to the first endpoint;

determining that the first endpoint permits adding a software component that generates periodic messages for keeping the logical pinhole open;

installing, with the network element, the software component on the first endpoint;

activating the software component to generate periodic messages toward a signaling controller in order to keep the logical pinhole open;

sending a command to the first endpoint to cause the software component to modify a frequency at which it generates periodic messages; and forwarding inbound multimedia signaling messages directed toward the first endpoint via the logical pinhole.

2. The method of claim 1, wherein the first endpoint is configured to begin communications by first addressing the signaling controller which receives the outbound multimedia signaling packets.

3. The method of claim 1, further comprising instructing one or more media controllers to forward all subsequent multimedia packets from the first endpoint to the second endpoint.

4. The method of claim 1, wherein sending a command to the first endpoint comprises sending a command to the first endpoint through the pinhole, wherein the command forces the endpoint to respond with a message that keeps the logical pinhole open.

5. A method, performed by a network element, for communicating packet multimedia data between a first endpoint and a second endpoint, the method comprising:

receiving an outbound multimedia signaling packet;

determining if the outbound multimedia signaling packet originated from a first endpoint that is logically behind a security device;

determining and storing information identifying a logical pinhole in the security device, wherein the logical pinhole is associated with expected inbound multimedia data packets directed to the first endpoint;

determining, from the outbound multimedia signaling packet, address information identifying a local network address of the first endpoint and an address of a security device that the first endpoint is behind;

storing the address information in association with information identifying the first endpoint;

receiving a request to provide the physical location of the first endpoint;

providing, in a response message, the address information for the first endpoint; and forwarding inbound multimedia signaling messages directed toward the first endpoint via the logical pinhole.

6. The method of claim 5, wherein providing the address information comprises:

embedding the address information associated with the first endpoint in the signaling packet; and communicating the signaling packet toward a destination entity.

7. A method, performed by a network element, for communicating packet multimedia data between a first endpoint and a second endpoint, the method comprising:

receiving an outbound multimedia signaling packet;

determining if the outbound multimedia signaling packet originated from a first endpoint that is logically behind a security device;

determining and storing information identifying a logical pinhole in the security device, wherein the logical pinhole is associated with expected inbound multimedia data packets directed to the first endpoint;

forwarding inbound multimedia signaling messages directed toward the first endpoint via the logical pinhole;

receiving a keep-alive message from the first endpoint;

determining that the keep-alive message originated from a registered endpoint; and acknowledging the keep-alive message without forwarding the keep-alive message to a call-control server that services calls from and to the first endpoint.

8. The method of claim 7, further comprising maintaining separate keep-alive timeout values for communications from an endpoint to the signaling controller and from the signaling controller to the call control server.

9. A method, performed by a network element, for communicating packet multimedia data between a first endpoint and a second endpoint, the method comprising:

receiving an outbound multimedia signaling packet;

determining if the outbound multimedia signaling packet originated from a first endpoint that is logically behind a security device;

determining and storing information identifying a logical pinhole in the security device, wherein the logical pinhole is associated with expected inbound multimedia data packets directed to the first endpoint;

forwarding inbound multimedia signaling messages directed toward the first endpoint via the logical pinhole;

receiving a signaling message from the first endpoint;

allocating a port pair on a media controller for the use of streams of media;

modifying the signaling message to point the streams of media to an address and port that have been allocated at the media controller for processing packets of a communication session between the second endpoint and the first endpoint;

forwarding the modified signaling message to a destination entity, wherein the media controller determines the logical pinhole based on receiving the streams of media from the second endpoint at the allocated address and port; and waiting, at the media controller, for the streams of media to arrive from both endpoints to detect media pinholes and for relaying the streams of media between the two endpoints.

10. An apparatus for communicating packet multimedia data between a first endpoint and a second endpoint, the apparatus comprising:

a communication interface that receives an outbound multimedia signaling packet;

a processor configured to:
determine if the outbound multimedia signaling packet originated from a first endpoint that is logically behind a security device;

determine and store information identifying a logical pinhole in the security device, wherein the logical pinhole is associated with expected inbound multimedia data packets directed to the first endpoint;

determine that the first endpoint permits adding a software component that generates periodic messages for keeping the logical pinhole open;

install the software component on the first endpoint;

activate the software component to generate periodic messages in order to keep the logical pinhole open, forward inbound multimedia signaling messages directed toward the first endpoint via the logical pinhole; and a storage module that stores the information identifying the logical pinhole, wherein the communication interface sends a command to the first endpoint to modify a frequency at which the first endpoint generates the periodic messages.

11. The apparatus of claim 10, wherein the first endpoint is configured to begin communications by first addressing a signaling controller which receives the outbound multimedia signaling packets.

12. The apparatus of claim 10, wherein the communication interface sends a command to one or more media controllers to forward all subsequent multimedia packets from the first endpoint to the second endpoint.

13. The apparatus of claim 10, wherein the communication interface sends the command to the first endpoint through the pinhole to force the endpoint to respond with a message that keeps the logical pinhole open.

14. An apparatus for communicating packet multimedia data between a first endpoint and a second endpoint, the apparatus comprising:
- a communication interface that receives an outbound multimedia signaling packet;
- a processor configured to:
  - determine if the outbound multimedia signaling packet originated from a first endpoint that is logically behind a security device;
  - determine and store information identifying a logical pinhole in the security device, wherein the logical pinhole is associated with expected inbound multimedia data packets directed to the first endpoint
  - forward inbound multimedia signaling messages directed toward the first endpoint via the logical pinhole; and
- a storage module that stores the information identifying the logical pinhole,
- wherein the processor is configured to determine, from the outbound multimedia signaling packet, address information identifying a local network address of the first endpoint and an address of a security device that the first endpoint is behind,
- wherein the storage module stores the address information in association with information identifying the first endpoint, and
- wherein the communication interface:
  - receives a request to provide the physical location of the first endpoint, and
  - sends, in a response to the request, the address information for the first endpoint.

15. An apparatus for communicating packet multimedia data between a first endpoint and a second endpoint, the apparatus comprising:
- a communication interface that receives an outbound multimedia signaling packet;
- a processor configured to:
  - determine if the outbound multimedia signaling packet originated from a first endpoint that is logically behind a security device;
  - determine and store information identifying a logical pinhole in the security device, wherein the logical pinhole is associated with expected inbound multimedia data packets directed to the first endpoint
  - forward inbound multimedia signaling messages directed toward the first endpoint via the logical pinhole; and
- a storage module that stores the information identifying the logical pinhole,
- wherein the communication interface receives a keep-alive message from the first endpoint,
- wherein the processor is configured to determine that the keep-alive message originated from a registered endpoint, and
- wherein the communication interface acknowledges the keep-alive message without forwarding the keep-alive message to a call-control server that services calls from and to the first endpoint.

16. The apparatus of claim 15, wherein the storage module stores separate keep-alive timeout values for communications from an endpoint to a signaling controller and from the signaling controller to the call control server.

17. An apparatus for communicating packet multimedia data between a first endpoint and a second endpoint, the apparatus comprising:
- a communication interface that receives an outbound multimedia signaling packet;
- a processor configured to:
  - determine if the outbound multimedia signaling packet originated from a first endpoint that is logically behind a security device;
  - determine and store information identifying a logical pinhole in the security device, wherein the logical pinhole is associated with expected inbound multimedia data packets directed to the first endpoint
  - forward inbound multimedia signaling messages directed toward the first endpoint via the logical pinhole; and
- a storage module that stores the information identifying the logical pinhole,
- a media controller,
- wherein the communication interface receives a signaling message from the first endpoint,
- wherein the media controller allocates a port for the use of streams of media,
- wherein the processor modifies the signaling message to point the streams of media to an address and port that have been allocated at the media controller for processing packets of a communication session between the second endpoint and the first endpoint,
- wherein the communication interface forwards the modified signaling message to a destination entity, wherein the media controller determines the logical pinhole based on receiving the streams of media from the second endpoint at the allocated address and port, and
- wherein the media controller waits for media to arrive from both endpoints so media pinholes can be detected and media can be relayed between the two endpoints.

* * * * *